(12) United States Patent
Honeymann et al.

(10) Patent No.: US 7,316,243 B2
(45) Date of Patent: Jan. 8, 2008

(54) FLUID DELIVERY SYSTEM

(75) Inventors: Trevor Honeymann, County Durhan (GB); Kenneth Robinson, County Durhan (GB)

(73) Assignee: Honeyman Group Limited (GB)

( * ) Notice: Subject to any disclaimer, the term of this patent is extended or adjusted under 35 U.S.C. 154(b) by 207 days.

(21) Appl. No.: 10/708,862

(22) Filed: Mar. 29, 2004

(65) Prior Publication Data

US 2004/0194830 A1 Oct. 7, 2004

Related U.S. Application Data

(63) Continuation of application No. PCT/GB02/04148, filed on Sep. 12, 2002.

(51) Int. Cl.
E03B 7/07 (2006.01)
(52) U.S. Cl. .................................. 137/563; 137/565.01
(58) Field of Classification Search ................ 137/563, 137/565.16, 565.33
See application file for complete search history.

(56) References Cited

U.S. PATENT DOCUMENTS

| | | | |
|---|---|---|---|
| 2,644,195 A * | 7/1953 | Bennes et al. ............... | 137/563 |
| 2,865,614 A * | 12/1958 | Bennes et al. ............... | 137/563 |
| 5,032,290 A | 7/1991 | Yamagata et al. | |
| 5,223,156 A * | 6/1993 | Maier ......................... | 137/563 |
| 6,142,179 A * | 11/2000 | Bjornsson et al. ........ | 137/565.37 |
| 6,499,670 B1 * | 12/2002 | Brown et al. ............ | 137/627.5 |
| 6,546,898 B1 * | 4/2003 | Rocheleau .................. | 137/563 |
| 6,918,406 B2 * | 7/2005 | Bae et al. ................... | 137/563 |

FOREIGN PATENT DOCUMENTS

| | | |
|---|---|---|
| DE | 1809113 | 6/1970 |
| DE | 3919074 A1 | 1/1991 |
| DE | 0594020 | * 10/1993 |
| DE | 19826696 A1 | 6/1997 |
| EP | 0594020 A1 | 10/1993 |
| FR | 2526064 | 4/1983 |

* cited by examiner

*Primary Examiner*—Gregory Hudson
*Assistant Examiner*—Cloud Lee
(74) *Attorney, Agent, or Firm*—Ronald E. Smith; Smith & Hopen, P.A.

(57) ABSTRACT

A fluid delivery system includes a fluid storage vessel that feeds a first pipe work loop having a first pump that urges fluid through the first loop at a first pressure and which returns to the vessel. At least one pipe work branch is fed from the storage vessel or the first pipe work loop. The pipe work branch includes a second pump that urges fluid through the pipe work branch at a second pressure. The fluid having flowed through a return manifold is returned to the vessel when the offtakes are closed. Opening of one or more offtakes opens the system to atmospheric pressure and causes the direction of fluid flow to reverse in one or more hoses that connect the one or more opened offtakes with the return manifold. The one or more opened offtakes is supplied with fluid from both the branch manifold and return manifold.

12 Claims, 9 Drawing Sheets

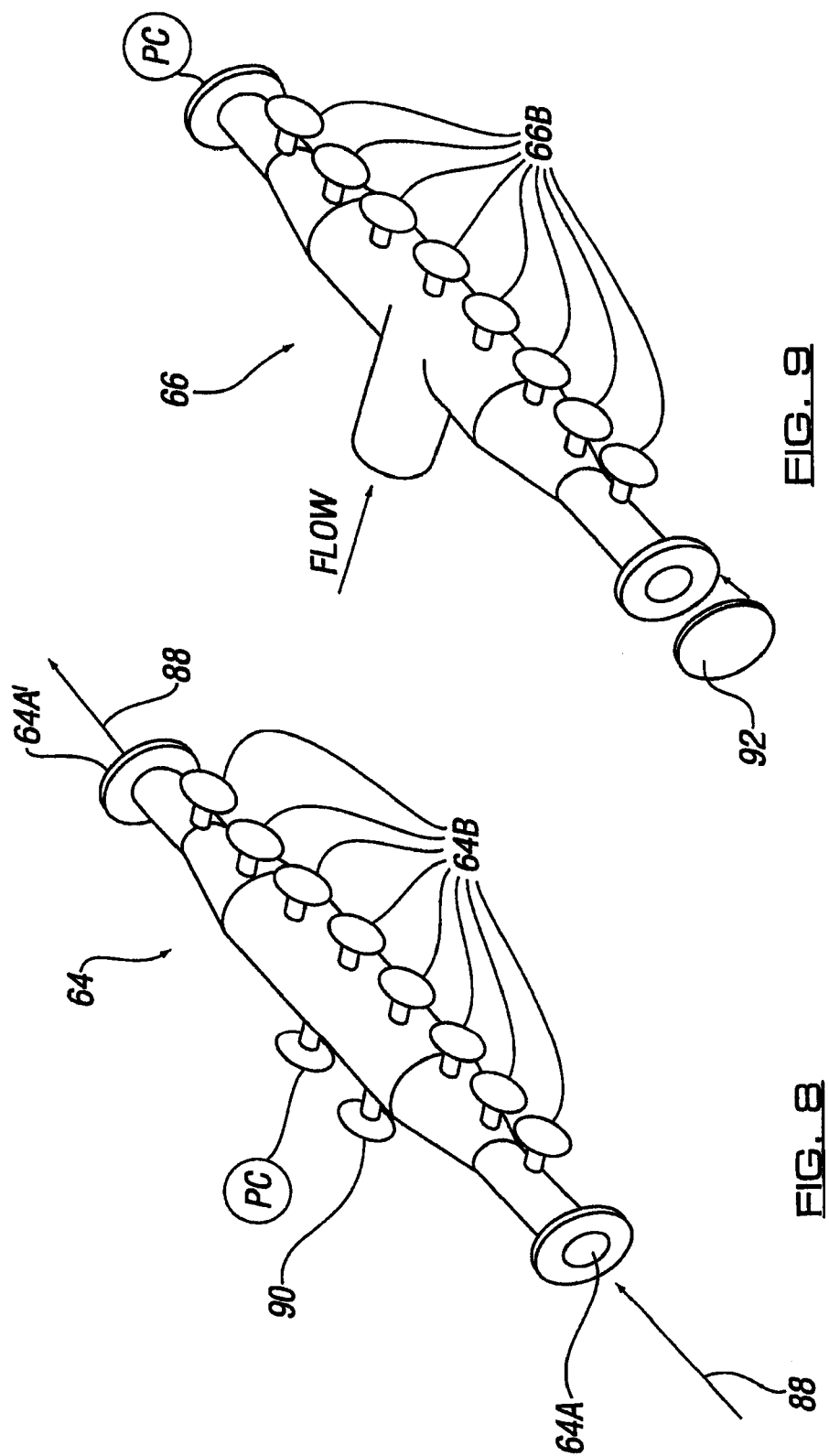

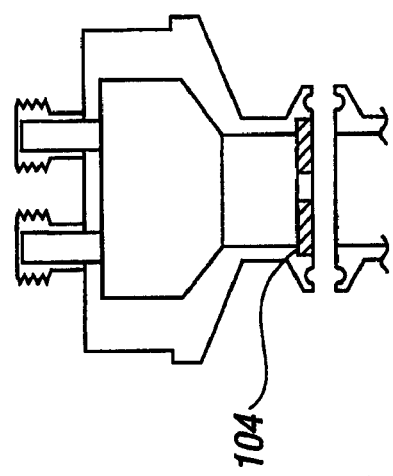
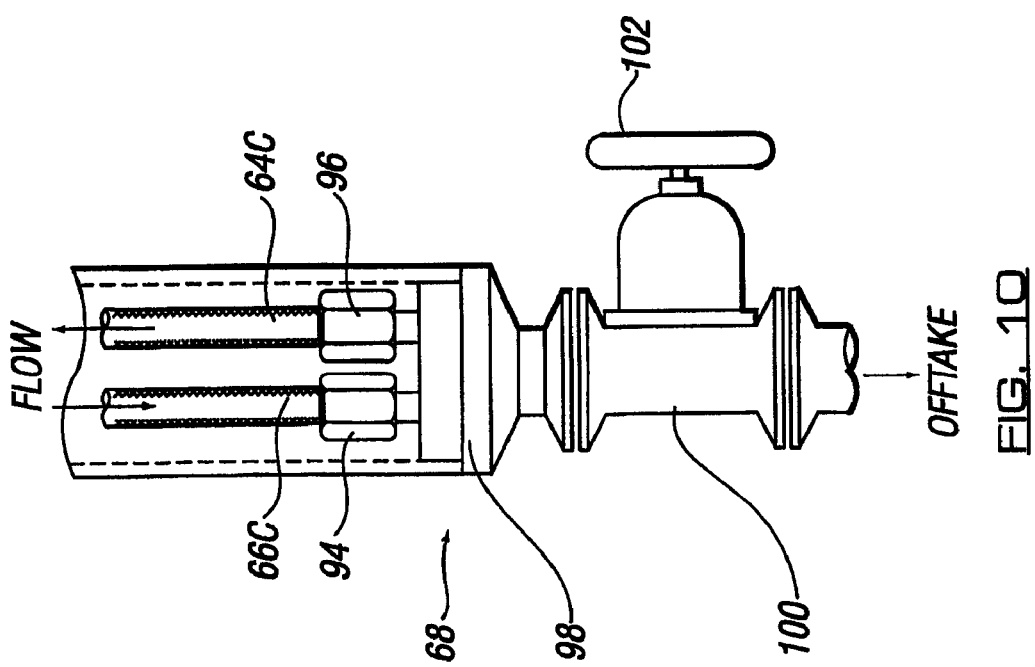

FLUID DELIVERY SYSTEM

PRIORITY CLAIM

The present application is a continuation of International Application, Serial Number PCT/GB02/04148, filed Sep. 12, 2002 which International Application claims a priority date of Sep. 28, 2001 based on prior filed Great Britain Serial Number GB/123340.2 and a priority date of Dec. 13, 2001 based on prior filed Great Britain Serial Number GB/0129813.2.

BACKGROUND OF THE INVENTION

1. Field of the Invention

This invention relates to a fluid delivery system, and more particularly to a hygienic fluid delivery system, the construction of which requires careful planning and analysis to ensure that the resulting system has minimal stagnancy of flow during operation and that bacteria growth is minimized if not eliminated entirely.

2. Description of the Prior Art

The types of fluid delivery systems hereinafter described are typically provided in a wide variety of plants, including Research & Development facilities generally, laboratories, silicon wafer manufacturing plants, breweries, pharmaceutical manufacturing facilities, and any installation where a plurality of sources of sterile water or other liquid may be required in a number of different locations remote from a supply tank for storing the water or other liquid.

Although the following description is provided with almost exclusive, reference to hygienic fluid delivery systems which deliver so-called Water for Injection (WFI), Purified Water (PW) and the like, it will be instantly appreciated that the invention has far wider application and may be applied to deliver any liquid to a predetermined location remote from a storage vessel through distribution pipe work.

It is also to be appreciated by the reader that the word "sterile"and cognate expressions as used hereinafter is not to be construed in its literal sense and includes liquids having a bacteria, germ or other contaminant content reduced beneath a desired level so that the said liquids are safe or suitable for a particular procedure.

Current systems for the delivery of sterile fluids, in their simplest form, consist essentially of a storage vessel supplied intermittently or continuously with a sufficient volume of pre-sterilized fluid. A system of steel pipe work is routed through the premises, for example a clinical laboratory, wherein WFI is required, said pipe work being for the most part conventionally concealed in the ceiling of each room through which said pipe work passes and descending from the ceiling only in those locations either where operatives are likely to regularly require a source of WFI or alternatively in locations conveniently accessible by a number of operatives working proximate said location. The pipe work is routed through said premises and ultimately returns to the storage vessel to return any excess fluid thereto.

There are a number of important factors which must be taken into account when designing a sterile fluid delivery system, but the most important is that the system as a whole must generally preclude any localized stagnation of fluid, either in the pipe work or the storage vessel and be free from crevices or similar areas where bacteria could become trapped and thus allowed to proliferateAccordingly the pipes are firstly commonly welded together using a very costly technique known as Tungsten Inert Gas (TIG) autogenous welding which ensures that the butt joints between adjacent sections of pipe are secured to one another without introducing unwanted, contaminants into the passageway within the pipes and ensuring that the join is as smooth as possible internally. Furthermore the interior surface of the various pipes which are joined together throughout the system is important in that said interior surface must be as smooth as possible and any bends in the pipes must preclude the formation of eddy currents during fluid flow there through. It will be appreciated that eddy currents give rise to localized volumes of fluid which are effectively stationary, and thus the temperature of these volumes can quickly drop to a level at which bacteria most readily thrive with the result that the sterility of the system as a whole is prejudiced.

Secondly, the operating temperature of the system is adjusted and maintained to ensure that any bacteria (for example mesophilic bacteria such as gram-negative pseudomonas commonly present in water) are either prevented from multiplying or are actually eliminated. A common temperature for WFI systems is 80° C. and to prevent any gradual reduction of the fluid temperature over time, a heater is commonly connected into the system.

It is to be mentioned that PW and other hygienic fluid systems can be operated at ambient temperatures, so much greater care and attention needs to be given to the construction of these types of systems which on account of the operating temperature are much more prone to bacterial proliferation.

Thirdly, it is important that a turbulent, as opposed to a laminar flow characteristic is developed within all sections of the pipe work again to minimize the risk of bacteria proliferation. For example, in both laminar and turbulent fluid flows, it is well known that the velocity of the fluid immediately adjacent a solid surface is minimal if not zero, whereas the velocity of fluid remote from such a surface is much greater. Hence the majority" of the volumetric "flow through a pipe is achieved through the middle of the pipe whereas only a comparatively small percentage of flow is attributable to the fluid moving proximate the interior surfaces of said pipe. This slow moving or stagnant fluid has the tendency to cool and thus not only are the conditions for bacteria proliferation improved adjacent to the interior surface of the pipe, but the fact that the fluid is either moving very slowly or not at all further increase the likelihood that bacteria will find a site on the pipe surface to germinate.

Turbulent fluid flows within sterile fluid delivery systems are desirable because velocity profile of the fluid proximate the interior surface of the pipe increase significantly more sharply than that of an equivalent laminar flow and the risk of bacteria proliferation and germination is thus mitigated. Biofilm formation on the internal surfaces is discouraged by such fluid velocities.

However, it is well known in fluid dynamics that the existence of turbulent flows within pipes depends on, among other things, the diameter of the pipe, and the velocity of fluid flow there through. In general, to the development of turbulent flow in pipes of a larger diameter requires a significantly larger fluid velocity than required to establish turbulent flow in smaller diameter pipes.

Fourthly, it is necessary to ensure that the storage vessel containing the WFI is recharged over a predetermined period of time, for example every two hours. Moreover, the system operates continuously so that the storage vessel is being continually emptied and simultaneously recharged to avoid any stagnation of fluid therein, and the time period is merely an indication of the length of time which would be taken to empty to the storage vessel completely under normal operating conditions without any simultaneous recharge.

It will also be appreciated that the systems with which this invention is concerned may have many tens of outlets or so-called off takes usually connected in series as an entire laboratory or building may need to be served by a single fluid delivery system. The diameter of the pipes commonly used in such systems may be of the order of 1-2Y2 inches (25-64 mm), and to ensure a turbulent flow within such a pipe the flow velocities are typically between 1-3 m/s.

In order to develop such a flow velocity, substantial and thus costly pumping apparatus is required, and when it is also considered that a number of different off takes may be in use simultaneously, dynamic control of this pump and/or alternatively some means of pressure regulation is required. Conventional Fluid delivery systems must possess an ability to deliver fluid through a number of offtakes opened simultaneously while nevertheless operating satisfactorily when none of the off takes are in use, for example overnight. The inherent disadvantage of series-type systems, in which a plurality of off takes are connected in series such as described, is that the opening of more than a few off takes simultaneously can have detrimental effect both on the flow characteristics and the ability to draw water at the correct flow and pressure at the various user off takes. The number of off takes which can be opened simultaneously in a system expressed as a percentage of the total number of off takes in a system is known as the diversity.

SUMMARY OF INVENTION

Various different pipe work loop and sub-loop configurations having different benefits and effects on diversity have been proposed.

Referring now to FIGS. 1, 2, 3, and 4 which show different fluid delivery systems of prior art configuration, each of these systems shows a storage vessel 2 with which pipe work 4 communicates to both feed off takes 6 which are embodied most simply in an openable valve and to return excess fluid to the storage vessel at 8.

Each of the systems shown in the Figures comprises at least one pump 10 and in the case of FIG. 2 a second pump 12, each of which urges fluid through the pipe work around the system in a flow direction 14.

It can be seen from FIG. 1 that the pipe work is sloped at 16 between off takes and this is a common feature of such systems to allow for drainage of the fluid from the system for cleaning purposes. A heater 18 and a pressure regulating valve 20 are also provided in series with the various off takes 6 and it will be appreciated that this simple series system functions in a very similar manner to a simple series electrical circuit, with the pump corresponding to a source of potential difference, the off takes corresponding to resistances dissipating power and the flow rate corresponding to the current. Indeed the analogy can be extended in the cases of FIGS. 2, 3, and 4 which effectively show parallel circuits.

The importance of this analogy is that as further off takes are added into a particular loop, the fluid flow which the system is capable of delivering through each of the off takes when open is reduced depending on the number of off takes in that loop. This is identical to the reduction in brightness of light bulbs connected in series in an electrical circuit as more and more light bulbs are connected.

In the case of FIG. 2 which shows a multiple loop arrangement, a second pump 12 drives fluid through a second loop of the system and effectively provides sufficient flow through said loop to feed the various off takes in that loop. In the case of FIG. 3, a sub-loop or true parallel arrangement is shown, and in the case of FIG. 4 a more complex main loop/sub loop arrangement is shown wherein four separate sub loops 22, 24, 26, 28 are fed from a main loop 30. Each of the sub loops is provided with a diaphragm valve 32 immediately after the join to the main loop, and additionally Constaflo™ flow regulating valves 34 are provided on each of the sub loops, at the most remote end of the main loop, and on a return loop 36 which links the main loop immediately after the pump 10 to the storage vessel 2. Without unnecessary description and analysis of the working of this arrangement, the diaphragm valves, flow regulating valves and return loop, are all provided with a view to increasing the effective diversity of the system as a whole and to ensure correct hydraulic balancing of the system.

The fundamental disadvantages of the systems described other than their limited ability to operate at maximum diversity are primarily related to the perceived permanent nature of the construction. For instance, in order to deliver a sufficient quantity of fluid around the system, the pipes must be of large diameter which both increases the cost of materials and construction. Stainless steel pipe sections currently used in the construction of such systems typically are provided in only 6 m lengths which necessitates a considerable amount of welding and increases the risk of areas of bacterial germination around the system due to crevices introduced through such welding or alternative jointing procedures.

In the event that an additional off take is required in an already installed system, it is very difficult and/or costly to modify the system, but perhaps most importantly the disruption to the system caused by modification can be severe. For example, the insertion of an additional off take would necessitate a full draining of the system, opening the system to insert the additional pipe work and off take required, together with subsequent resterilisation and recharging. Furthermore, the additional off take could foreseeably necessitate a larger pump and additional flow and pressure regulating components. It has been estimated that the average cost of installation of a fluid delivery system is approximately £200 per meter and it will thus be appreciated that these systems can significantly increase the cost of premises construction. The welding process is also subject to rigorous and costly inspection and qualification procedures as part of the regulatory traceability requirements of HM Medicines Inspectorate and the like.

It is an object of this invention to provide a fluid delivery system whose effective diversity is above 90% and preferably approximately 100% but which is significantly less expensive than prior art systems to construct, install, and inspect and subsequently certify.

It is a further object of the invention to provide a system which can be installed with the minimum number of crevices and imperfections in the interior surface of the pipe work through which the fluid flows, and additionally to offer the possibility of installing a substantially crevice-free system, at least in the pipe work coupling the off takes to the pumping room. It is a further object of the invention to provide a system with as few joints between respective sections of pipe work as possible.

According to the invention in a first aspect there is provided a fluid delivery system comprising a storage vessel for fluid which feeds a first pipe work loop including, a first pump which urges fluid through said first loop at a first pressure and which returns to said vessel, said system including at least one pipe work branch fed from aid storage vessel or said first pipe work loop, said pipe work branch including a second pump which urges fluid through said pipe work branch at a second pressure downstream of said second pump, each pipe work branch terminating in a branch manifold having at least a fluid inlet and one or more fluid outlets to the latter of which are connected one or more hoses which feed one or more off takes from which fluid can be drawn from the system, each branch manifold providing a corresponding return manifold in fluid communication with said first pipe work loop to which said off takes are connected by further hoses such that fluid can flow from said branch manifold through said hoses and thence through said return manifold and characterized in that the fluid having flowed through the return manifold is returned to the vessel when the off takes are closed and opening of said one or more off takes, and thus the opening of said system to atmospheric pressure at one or more locations, causes the direction of fluid flow to reverse in the one or more hoses which connect said one or more opened off takes with the return manifold, said one or more opened off takes being supplied with fluid from both the branch manifold and return manifold.

Most preferably, the branch manifold is fed from the storage vessel.

Ideally the branch and return manifolds have at least a fluid inlet and one or more fluid outlets, said branch and return manifolds being disposed downstream of said first and second pumps with fluid communication between said manifolds being achieved by at least one hose connectable to fluid outlets on respective manifolds and including one or more off takes thus allowing fluid flow from the storage vessel through the pipe work branch, branch manifold, hose, return manifold and first pipe work loop ultimately returning to said storage vessel and permitting fluid off take at a desired location.

Preferably, said return manifold is provided with a fluid inlet and a primary fluid outlet o allow for connection of said manifold within the first pipe work loop and a plurality of secondary outlets to which hoses having off takes may be connected to allow for fluid communication with the branch manifold.

Further preferably the branch manifold is provided with a fluid inlet and only secondary outlets to which hoses having off takes may be connected such that the fluid flowing into said branch manifold is urged into one or more hoses.

Preferably the fluid pressure within the return manifold is greater than the fluid pressure in the branch manifold, and most preferably both these pressures are above ambient atmospheric pressure such that the opening of an off take opens the fluid within to atmospheric pressure and the fluid flow direction in the length of hose between said off take and said return manifold reverses and both manifolds urge fluid towards said open off take.

In most preferable circumstances, a plurality of hose connections are made between the branch manifold and the return manifold, each connection consisting of a first hose, one end of which is connected to one fluid outlet the branch manifold and the alternate end of which is connected to an off take, a second hose having one end connected to the off take and the alternate end connected to a fluid outlet of the return manifold. Most preferably, each hose connection between branch and return manifolds consists only of a single off take, but alternately, each connection may consist of first and second hoses, ends of which are connected to the branch and return manifolds respectively, alternate ends of said hoses being connected to first and second primary off takes, and the connection further comprising one or more secondary off takes interconnected by intermediary hoses between said first and second primary off takes and second secondary off takes.

Further preferably each hose is made of a flexible polymeric or plastics material such as PTFE.

Preferably, the hose diameter is in the region of 5-25 mm.

Most preferably at least one of the first or second pumps is dynamically controlled depending on the fluid pressure within the respective return or branch manifold, and most preferably the pump driving fluid through the first pipe work loop is dynamically controlled depending on the instantaneous fluid requirements of the system, i.e. the number of off takes which are open at any one instant.

Most preferably only the second pump is dynamically controlled depending on the fluid pressure within the respective return and branch manifolds.

The system described above has the surprising advantage that the opening of any off take provided on any particular hose connection between the manifolds causes a reversal in the direction of fluid flow in the hose section from the return manifold to the said off take. Such" flow direction reversal is achieved because the fluid pressure developed in the return manifold is greater than the pressure developed in the branch manifold and thus the fluid is urged through the off take (which is effectively, at atmospheric pressure once opened) along both sections of hose linking the off take to said manifolds.

The system has many attendant advantages resulting from the novel arrangement described, particularly including:
1. Lower cost of installation and associated validation;
2. Elimination of need for site-wide welding and the associated hazards of this process;
3. Facility for installation by non-specialist contractors (as the hoses and off takes may be installed by for example electrical cable installers);
4. Easy relocation/isolation of individual off takes;
5. Future pre-cleaned off takes can be easily added to the spare manifold secondary outlets and brought on-line without interruption to the live existing system;
6. Offtake hoses can be individually sterilized;
7. Hoses can be drained by (sterile) air or gas being blown there through thus avoiding extra costs for routing gravity drainage, and
8. Hose sterilization can be achieved by a number of methods, such as chemical re-circulation, steam out, hot sterile air (160° C.), ozone.

Perhaps the most important advantage is that provided the pumps are effectively dynamically controlled, the diversity of the system remains at almost 100% as more and more offtakes are simultaneously opened. The only limit to the number of offtakes which can be opened simultaneously without any appreciable flow reduction there through is the diameter of the pipes and manifolds through which the fluid is urged by the pump (and thus the volume of fluid which can be delivered to the manifolds by said pumps).

In a further aspect of the invention there is provided a fluid delivery system for the delivery of sterile fluid to a number of offtakes, each offtake selectively movable between open and closed conditions, said system including a storage vessel and fluid cleaning components provided in line in a first pipe work loop, said pipe work loop including a pump to urge fluid through said pipe work loop at a first pressure and return fluid to the vessel, said pipe work loop including a branch manifold and a return manifold and characterized in that said branch and return manifold include, for each offtake, a pipe connection leading from the receptive manifolds to said offtake such that, each of the plurality of offtakes is connected in parallel to the branch and return manifolds.

In one embodiment the opening of an offtake causes the supply of fluid to that offtake via respective pipes from the branch and return manifold and does not affect the fluid in the pipe work to the other offtakes. Typically the opening of said offtake or a series of offtakes causes the direction of fluid flow to reverse in the one or more pipes which connect said one or more opened offtakes with the return manifold.

BRIEF DESCRIPTION OF DRAWINGS

A specific embodiment of the invention is now described by way of example with reference to the accompanying drawings wherein:

FIGS. 8, 9 show perspective views of possible loop and branch manifold assemblies;

FIGS. 10, 11 show schematically possible offtake assemblies; and

DETAILED DESCRIPTION

Figure 1:
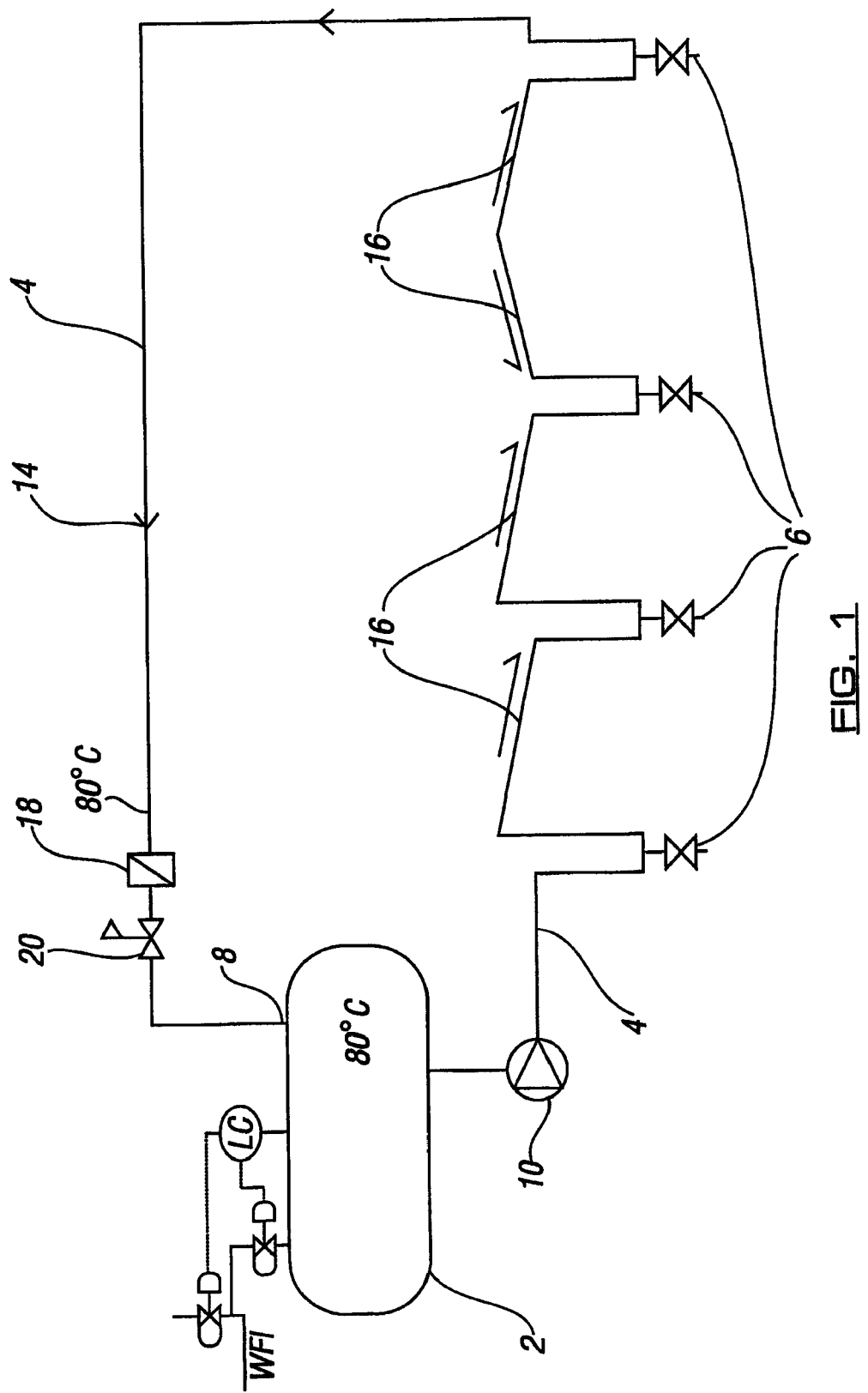
FIGS. 1-4 schematically show fluid delivery systems of prior art configuration.
Figure 2:
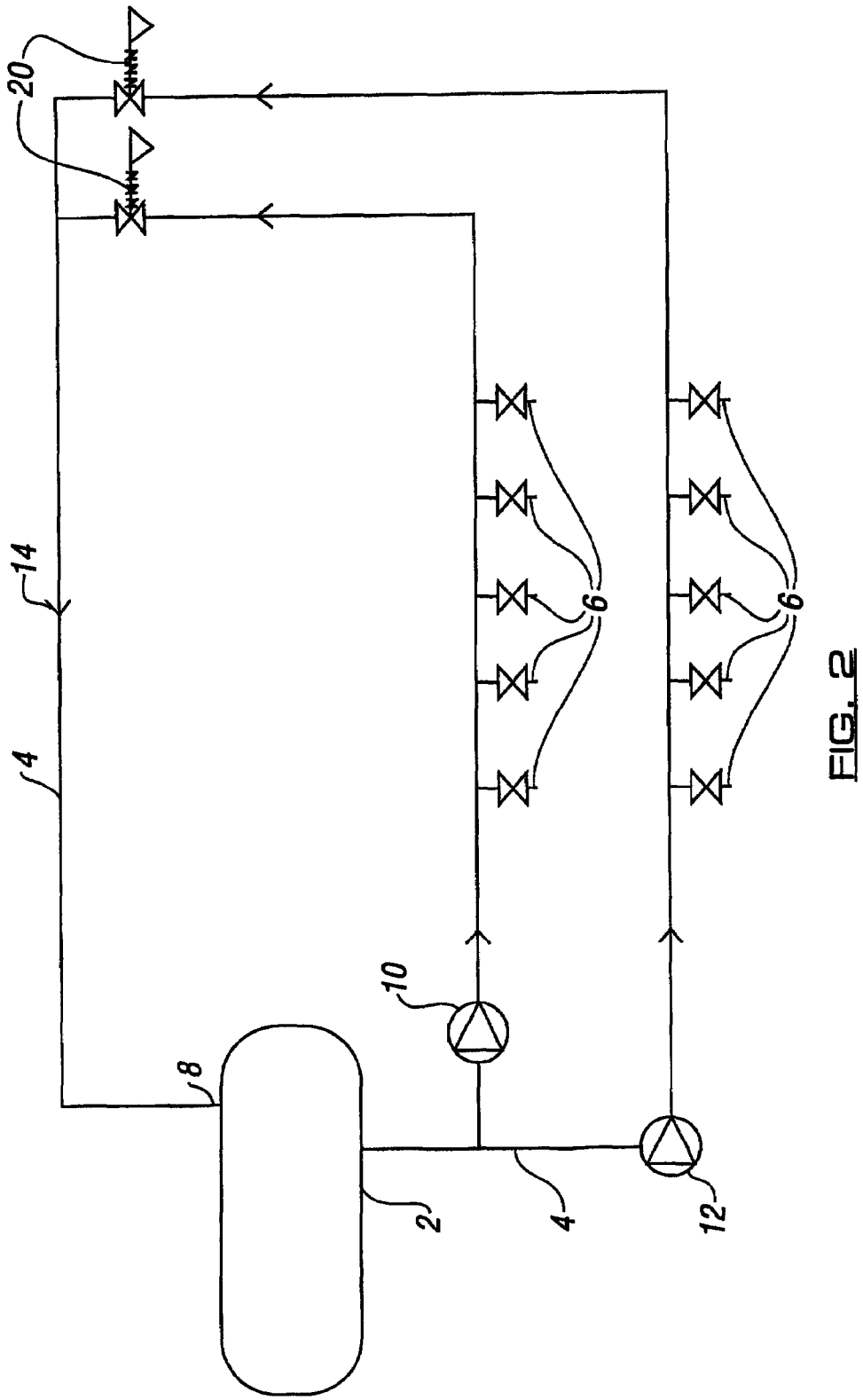
Figure 3:
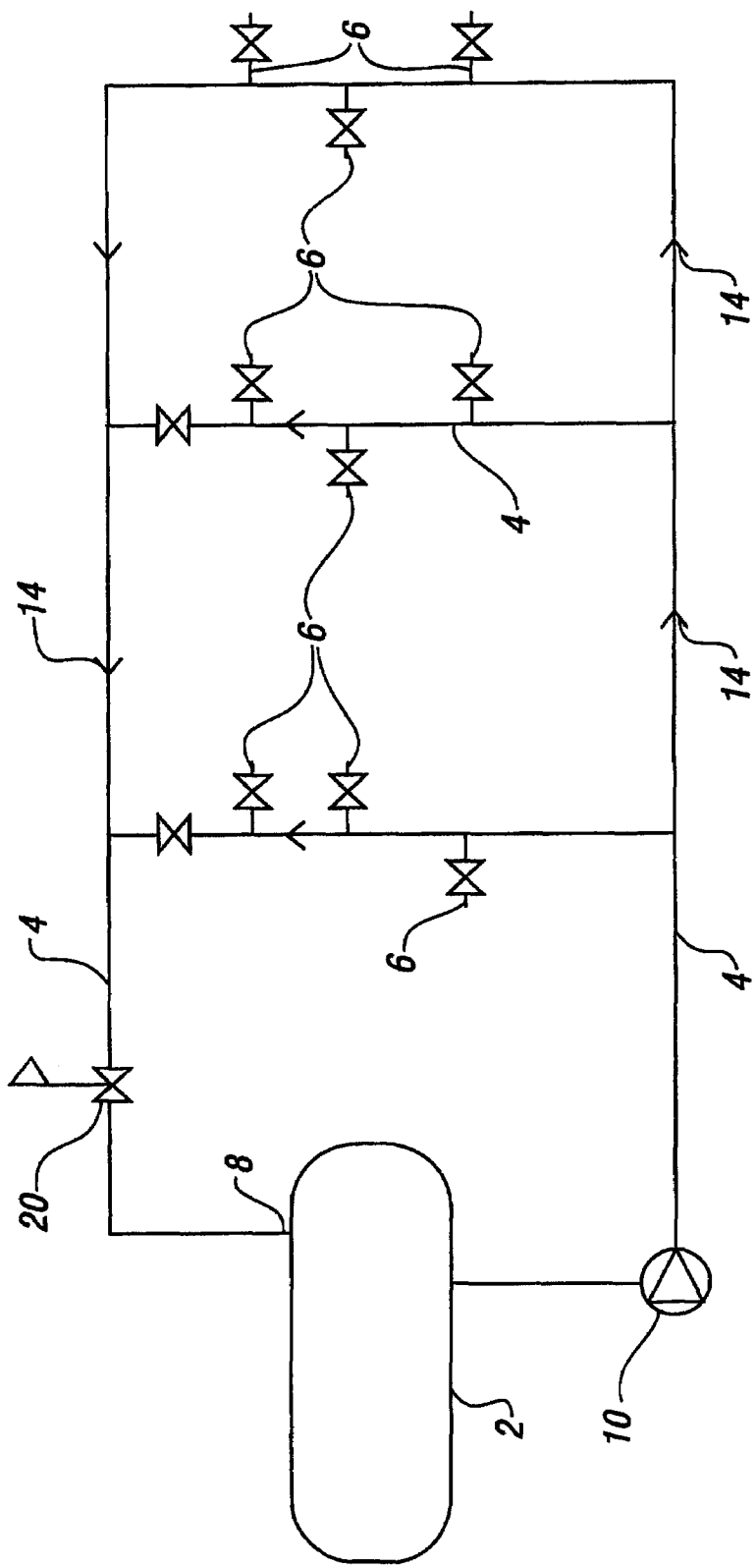
Figure 4:
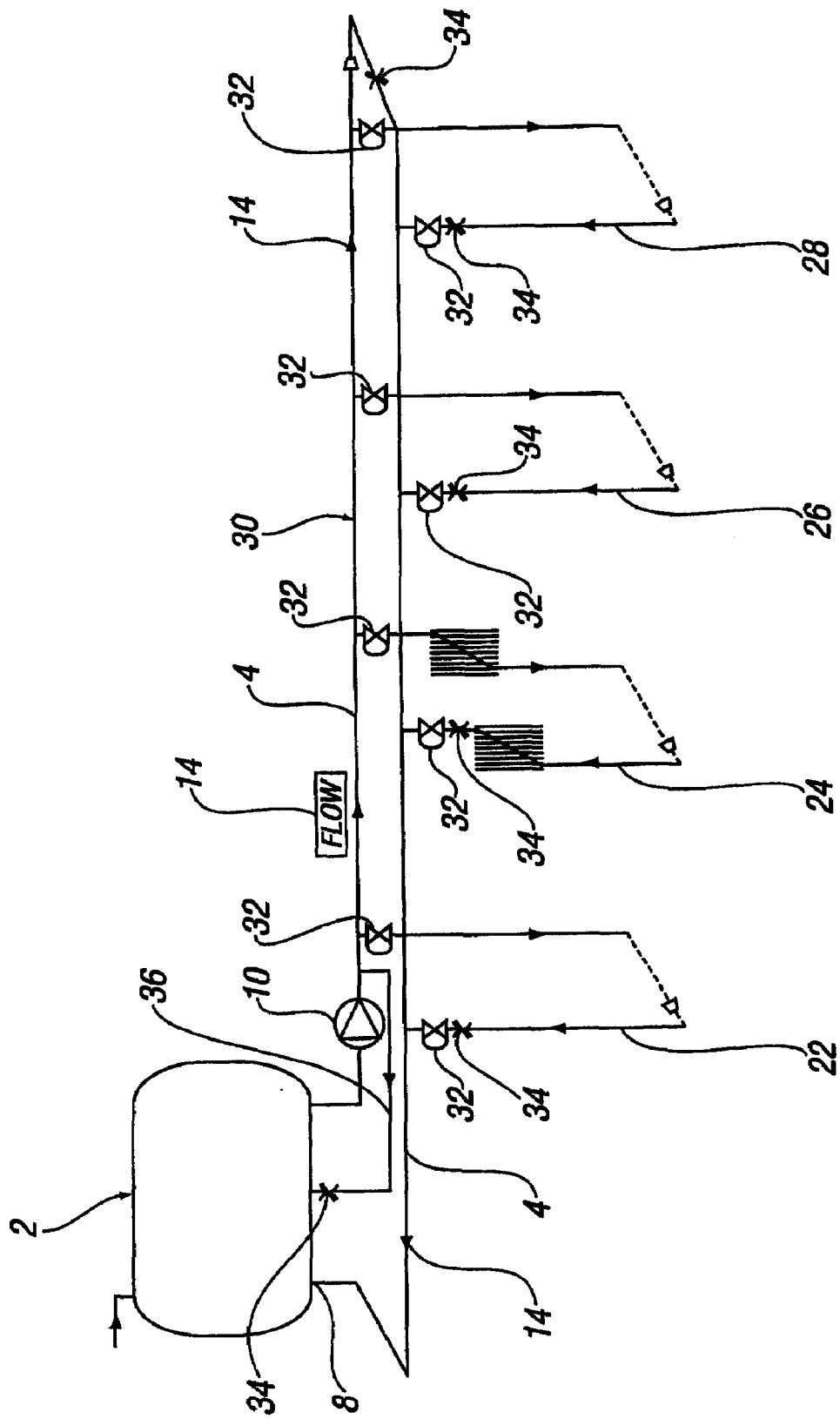
Figure 5:
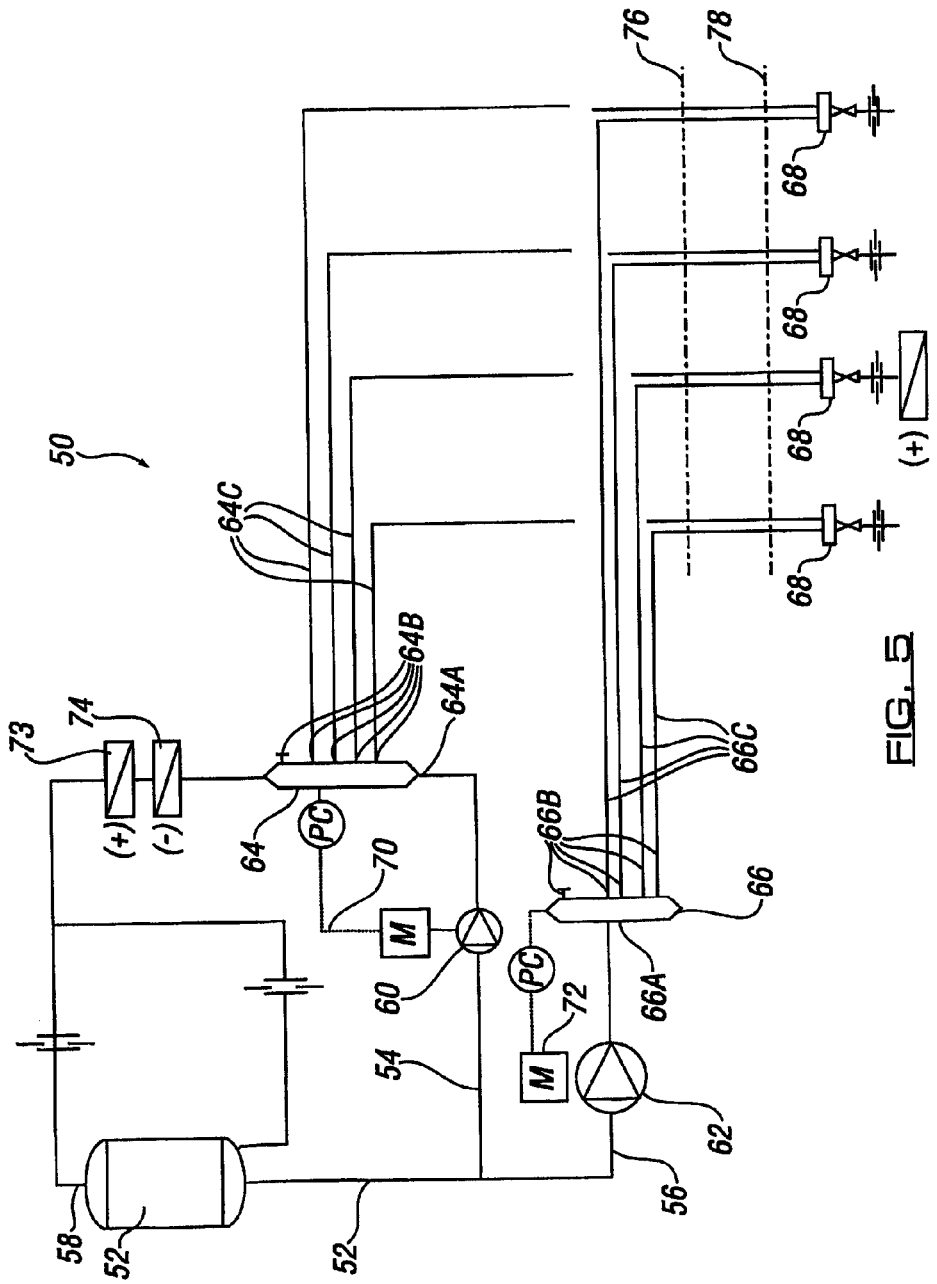
FIG. 5 schematically shows a fluid delivery systems according to the invention.

Referring firstly to FIG. 5 there is shown a fluid delivery system 50 comprising a storage vessel feeding pipe work 52 which divides into a pipe work loop 54 and a pipe work branch 56. The loop 54 ultimately returns to the storage vessel 52 at 58 to recharge said vessel with fluid pump around the system.

In each of the loop 54 and the branch 56 are provided pumps 60, 62 respectively which are located upstream of a return manifold 64 and a branch manifold 66 each of which has at least a primary fluid inlet 64A, 66A and a number of secondary fluid outlets 64B, 66B to which hoses 64C, 66C can be connected. Each of the hoses 64C, 66C is connected to an offtake which essentially comprises an openable valve which when closed allows fluid by pass from the hoses 66C to 64C.

In a preferred embodiment, the pumps 60, 62 are dynamically controlled by coupling the pump motor to manifold pressure sensors schematically represented at 70, 72 in response to changes in fluid pressure inside the manifolds 64, 66. In this manner, the fluid flow and pressure can be automatically maintained at required levels when one or more of the offtakes is opened to deliver fluid there through. It is to be mentioned\that this arrangement provides the most accurate control, but once the operating limits of a particular system are determined it is more likely that only a single pump need be dynamically controlled.

Downstream of the return manifold, there may optionally be provided a sanitization unit and/or a heat exchanger 73, 74 to ensure that the desired temperature is maintained during operation. Thereafter fluid is returned to the vessel 52 from which it is later pumped around the system.

Example system operating conditions include a minimum flow rate of 100 liters/min in the pipe work branch, a maximum flow rate of 160 liters/min, a pressure of 6 bar in the branch manifold, and a minimum flow rate of 45 liters/min in the pipe work loop, a maximum flow rate of 225 liters/min and a return manifold pressure of 2 bar.

FIG. 5 also schematically shows a possible layout of the system in that the bulk of the apparatus used in the system is located in a plant room schematically defined above the dotted line 76, a portion of the length of the hoses 64C, 66C which communicate with the offtakes and the respective loop and branch manifolds are disposed in a roof or wall void represented between dotted line 76 and a further dotted line 78, and the offtakes 68 are optionally connected at the end of shrouds secured to the roof or walls to conceal the hoses.

Figure 6:
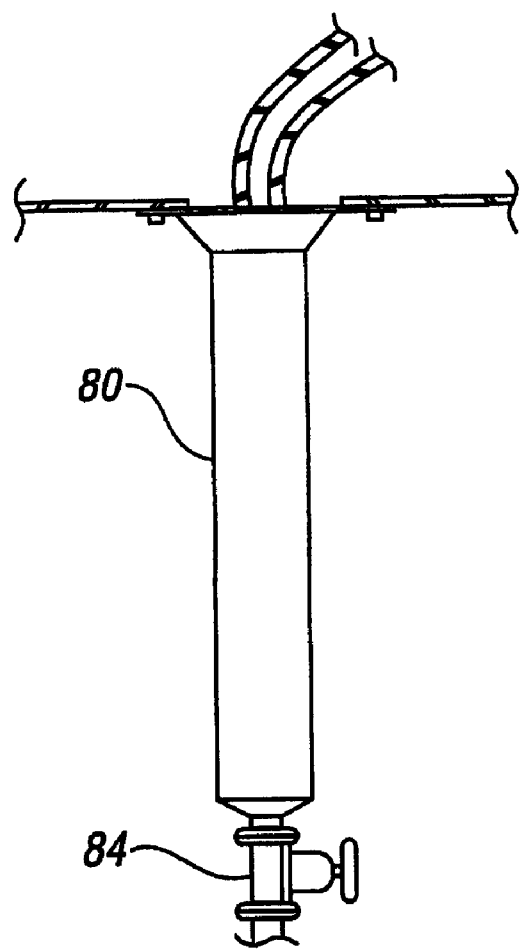
FIGS. 6, 7 show details of possible offtake shroud assemblies.
Figure 7:
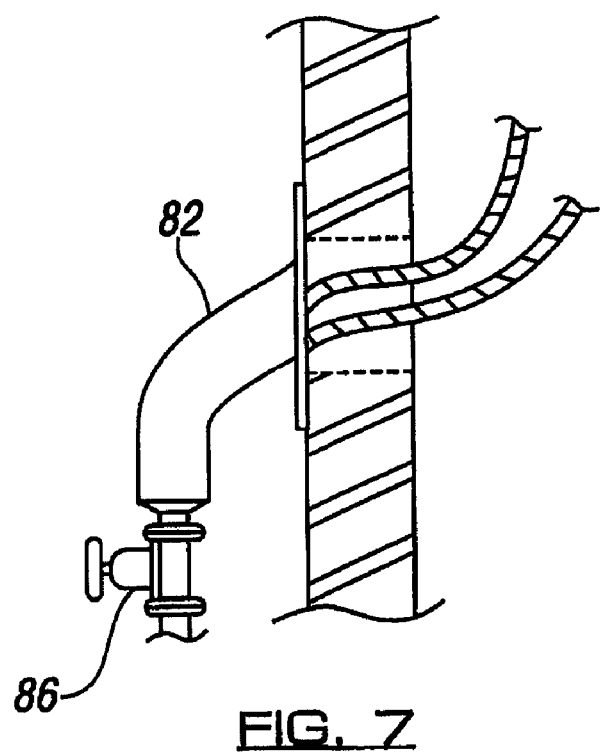

Examples of such shrouds 80, 82 and offtakes 84, 86 are shown in FIGS. 6 and 7.

FIGS. 8, 9 show possible embodiments of the return manifold 64 and branch manifold 66. The manifolds are different because fluid is required to flow through the return manifold 64 from a primary inlet 64A to a primary outlet 64A" in the direction indicated at 88. There are further provided various secondary fluid outlets 64B the number of which corresponds to the number of offtakes desired in a particular system, and although the word "outlet" is used in connection with these fittings, it is to be appreciated that fluid in generally will only flow out of same when the particular offtake fed by the hose connected to said outlet is opened. In the alternate circumstance when the offtake is closed, fluid will flow into the manifold through outlet and be combined with the fluid flow through the manifold from one end to the other as indicated at 88. A pressure control outlet PC for dynamic pump control and a spare instrument access 90 are also provided.

In the case of the branch manifold 66, a primary inlet 66A is provided, together with a number of secondary outlets 66B to which the hoses 66C are connected. A pressure control outlet PC is disposed at one end of the manifold 66 whereas the opposite end is blanked off at 92 to prevent any fluid escape through said end. In the case of the branch manifold, fluid flows continually through the outlets 66B regardless of whether the offtakes fed by hoses 66C are open or closed.

Referring to FIGS. 10 and 11, there is shown a schematic representation of an offtake having connectors 94, 96 to which hoses 66C, 64C are connected to feed the offtake with fluid. A chamber 98 is provided which allows for fluid flow from hose 66C to hose 64C when the offtake is closed and for fluid reversal in hose 64C when the offtake is opened, and this in turn is connected to a standard diaphragm valve or similar 100 having actuator 102 if necessary. A schematic sectional view of the chamber is shown in FIG. 11 and it can be seen from this figure that the flow of fluid within said component may be achieved by orifice plates 104 provided internally thereof.

In circumstances where a user only gradually opens a valve to an offtake, it is foreseeable, depending on the design of the various components within a system, that the fluid flow velocity within hose 64C could merely reduce as opposed to become reversed, and in particular circumstances it may also transpire that on opening an offtake by a predetermined amount, the fluid velocity in the hose 64C reduces to zero, said offtake being supplied entirely by fluid flow to the offtake through hose 66C.

Such operating conditions are envisaged only transiently and would not prevail for any significant length of time which could materially affect the hygiene of the fluid within the system as a whole. It is also to be mentioned that these particular operating characteristics will only arise infrequently, and the most desirable system operation will involve the reversal of fluid flow direction through hose 64C.

Figure 12:
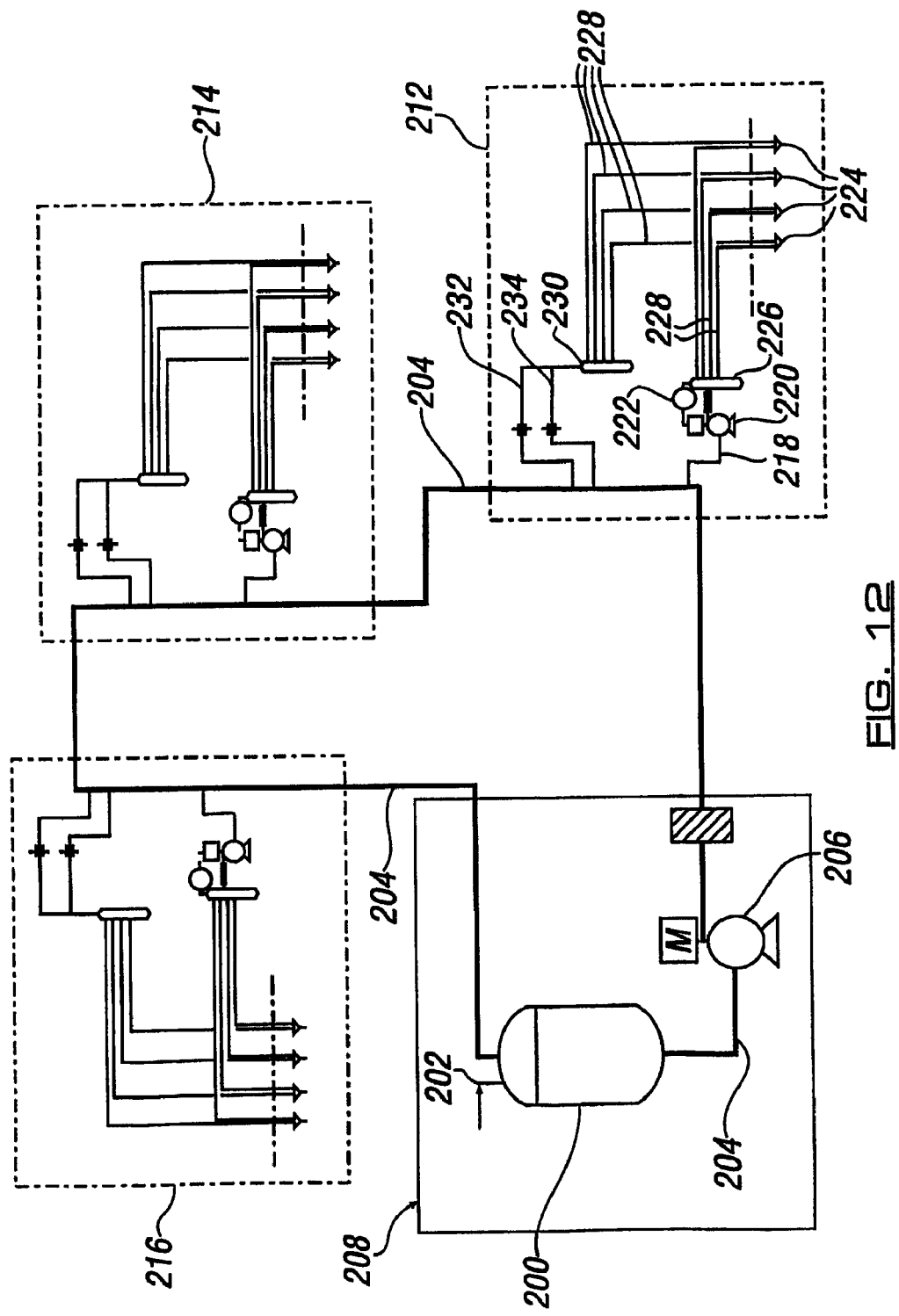
FIG. 12 shows an alternative arrangement for a system according to the invention.

Finally, referring to FIG. 12, there is shown an alternative arrangement of a fluid delivery system which functions in accordance with the invention. In the arrangement shown, a storage vessel 200 is fed with a supply of purified or sterile water at 202, and the vessel 200 is connected within a first pipe work loop 204. Within said first pipe work loop, there is disposed a low pressure, high volume pump 206 which causes fluid flow around the loop 204. The box 208 in this figure which surrounds the pump and vessel is representative of a site pumping and equipment room, and remaining boxes in dotted lines 210, 212, 214 are representative of either different buildings to which a supply of sterile fluid is required to be delivered, or alternatively different but remotely located zones in the same building.

Accordingly, the first pipe work loop is constructed around a path which approaches each zone at a suitable location. In the region of each zone, a branch 218 is taken from the main loop and feeds a pump 220 which may be dynamically controlled at 222 according to instantaneous fluid usage requirements at the various offtakes 224 required or being used in that zone at any time. The pump 220 delivers pressurized fluid to a branch manifold 226 which is connected to said offtakes 224 by hoses 228, which are in turn connected to a return manifold 230 by further hoses 228. Return legs 232, 234 are provided between the return manifold and the first loop 204 on the one hand to enable fluid to rejoin the first loop from said return leg in the, event that no offtakes are opened in a particular zone, and on the other hand to allow fluid to fluid towards and through the return manifold in the event that one or more offtakes are opened in that particular zone. It will be appreciated that a second pump may be required in one of the return legs 232, 234 to "ensure a fluid flow from the first loop 204 into said return manifold and back to the first loop along the alternate leg, but equally it is envisaged that the system may be designed that such a pump might not be required.

The arrangement shown in the Figure demonstrates that it is not necessary to locate all of the storage vessel, the first pump, the first pipe work loop, the pipe work branch, and the branch and return manifolds in the same room.

In summary therefore, a fluid delivery system is described whereby sterile liquid may be delivered efficiently to a number of remote locations while nevertheless maintaining a continuous fluid flow through the system to prevent any bacterial growth. The system includes a storage tank feeding a first pipe work loop including a first pump which urges fluid through said first loop at a first pressure and which returns to the tank, and also includes at least one pipe work branch fed from the tank and having a second pump which urges fluid through the branch at a second pressure downstream of the, second pump. The system functions efficaciously in that a branch manifold terminates each branch and a return manifold is provided in the first pipe work loop. Between these two manifolds are connected one or more supply hoses interrupted by an offtake component which is a simple valve opening through which the fluid can be selectively delivered at the desired location. When one or more offtakes are opened, the conventional fluid flow in the hose which links that offtake to the return manifold is reversed on account of the pressures at which the two pumps in the first pipe work loop and the pipe work branches operate. This type of operation allows for practically 100% diversity, i.e. that condition where as many or as few offtakes in the system can be opened simultaneously without any practical reduction in the availability of fluid. Now that the invention has been described,

The invention claimed is:

1. A fluid delivery system, comprising:
   a fluid storage vessel;
   a first pipe work loop;
   said fluid storage vessel being in fluid communication with said first pipe work loop;
   said first pipe work loop including a first pump which urges fluid to flow in a first direction through said first pipe work loop at a first pressure and which follows a path of travel that returns to said fluid storage vessel;
   at least one pipe work branch;
   said fluid storage vessel being in fluid communication with said at least one pipe work branch;
   said pipe work branch including a second pump which urges fluid to flow through said pipe work branch at a second pressure downstream of said second pump;
   a branch manifold positioned in said pipe work branch downstream of said second pump;
   said branch manifold having a fluid inlet and at least one fluid outlet;
   at least a first offtake positioned downstream of said branch manifold;
   at least a first hose providing fluid communication between at least a first fluid outlet of said branch manifold and said at least a first offtake from which fluid can be drawn from the system;
   a return manifold in said first pipe work loop, downstream of said first pump, said return manifold having a fluid inlet and at least one fluid outlet;
   at least a second hose providing fluid communication between said first fluid outlet of said return manifold and said at least one offtake;
   whereby fluid flows in said first direction through the return manifold and is returned to the fluid storage vessel when all of said offtakes are closed;
   whereby opening of at least one offtake opens said system to atmospheric pressure;
   whereby fluid flowing in said first direction from said at least one offtake to said return manifold is made to flow in a second direction opposite to said first direction when said at least one offtake is opened;
   whereby said at least one offtake is supplied with fluid from said return manifold and said branch manifold when said fluid flow is reversed;
   whereby said system delivers sterile liquid to at least one remote location downstream from said at least one offtake while maintaining a continuous flow through the system to inhibit bacterial growth; and
   whereby said system has two fluid-carrying circuits that simultaneously deliver water from said fluid storage vessel to at least one offtake when at least one offtake is open and that keep the water circulating when all offtakes are closed, said constant circulation inhibiting bacterial growth in the absence of disinfectants and elevated fluid temperatures.

2. A fluid delivery system according to claim 1, further comprising:
   said return manifold including a primary fluid inlet and a primary fluid outlet to allow for connection of said return manifold within the first pipe work loop and a plurality of secondary outlets to which said first hoses are connected to allow fluid communication with the offtakes.

3. A fluid delivery system according to claim 1, further comprising:
   said branch manifold including a primary fluid inlet and a plurality of secondary outlets to which said second hoses are connected such that the fluid flowing into said branch manifold is constrained to flow to said offtakes.

4. A fluid delivery system according to claim 1, further comprising:
said fluid pressure within the return manifold being greater than the fluid pressure in the branch manifold.

5. A fluid delivery system according to claim 1, further comprising:
said pressures in the branch and return manifolds being above ambient atmospheric pressure such that the opening of an offtake opens the fluid within said branch and return manifolds to atmospheric pressure and the fluid flow direction in the first hose between said offtake and said return manifold reverses so that said fluid is constrained by said branch and return manifolds to flow towards said open offtake.

6. A fluid delivery system according to claim 1, further comprising:
a plurality of hose connections made between the branch manifold and the return manifold, each connection consisting of a first hose, a first end of which is connected to one secondary fluid outlet of the return manifold and a second end of which is connected to an offtake, a second hose having a second end connected to the offtake and a first end connected to a secondary fluid outlet of the branch manifold.

7. A fluid delivery system according to claim 6, further comprising:
each respective hose connection between branch and return manifolds sharing a common offtake.

8. A fluid delivery system according to claim 6, further comprising:
each connection including said first and second hoses, first ends of which are connected to the branch and return manifolds respectively, second ends of which are connected to first and second primary offtakes, and the connection further comprising at least one secondary offtake interconnected by intermediary hoses between said first and second primary offtakes and said at least one secondary offtake.

9. A fluid delivery system according to claim 1, further comprising:
each hose being made of a flexible polymeric or plastics material such as PTFE.

10. A fluid delivery system according to claim 9, further comprising:
said hose having a diameter of about 5-25 mm.

11. A fluid delivery system according to claim 1, further comprising:
at least one of the first or second pumps being dynamically controlled depending on the fluid pressure within the respective return or branch manifold, and the pump driving fluid through the first pipe work loop being dynamically controlled depending on instantaneous fluid requirements of the system such as the number of offtakes which are open at any one instant.

12. A fluid delivery system according to claim 11, further comprising:
only the second pump being dynamically controlled according to the fluid pressure within the respective return and branch manifolds.

* * * * *